(12) United States Patent
Yang et al.

(10) Patent No.: US 10,359,085 B2
(45) Date of Patent: Jul. 23, 2019

(54) PIN-MOUNTED ROCKER

(71) Applicant: Ford Global Technologies, LLC, Dearborn, MI (US)

(72) Inventors: Emily Yang, Ann Arbor, MI (US); Nicholas Niemiec, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 66 days.

(21) Appl. No.: 15/616,442

(22) Filed: Jun. 7, 2017

(65) Prior Publication Data

US 2018/0355926 A1    Dec. 13, 2018

(51) Int. Cl.
    *F16D 41/12*    (2006.01)

(52) U.S. Cl.
    CPC .................................... *F16D 41/12* (2013.01)

(58) Field of Classification Search
    CPC ....................................................... F16D 41/12
    See application file for complete search history.

(56) References Cited

U.S. PATENT DOCUMENTS

| | | | | |
|---|---|---|---|---|
| 1,473,564 | A | * | 11/1923 | Klepper ................. F16D 41/12 192/41 R |
| 1,509,446 | A | * | 9/1924 | Skinner .................. F16D 41/12 192/47 |
| 3,486,597 | A | * | 12/1969 | Carlton .................. F16D 41/12 192/46 |
| 4,548,304 | A | * | 10/1985 | Nagata ................... F16D 41/12 192/46 |
| 5,971,122 | A | | 10/1999 | Costin et al. |
| 6,065,576 | A | | 5/2000 | Shaw et al. |
| 6,575,275 | B2 | | 6/2003 | Muramatsu et al. |
| 7,100,756 | B2 | | 9/2006 | Kimes et al. |
| 7,448,481 | B2 | | 11/2008 | Kimes et al. |
| 7,451,862 | B2 | | 11/2008 | Kimes et al. |
| 7,455,157 | B2 | | 11/2008 | Kimes et al. |
| 7,661,518 | B2 | | 2/2010 | Kimes |
| 9,127,730 | B2 | | 9/2015 | Greene et al. |
| 2009/0090590 | A1 | * | 4/2009 | Joppeck ................. F16D 41/12 192/42 |
| 2014/0326566 | A1 | | 11/2014 | Lindemann et al. |
| 2016/0017937 | A1 | | 1/2016 | McConnell et al. |
| 2016/0348741 | A1 | | 12/2016 | Niemiec et al. |
| 2017/0108102 | A1 | * | 4/2017 | De Jesús Rivera ..... F16D 41/12 |
| 2017/0138416 | A1 | * | 5/2017 | Lee ......................... F16D 41/12 |
| 2017/0356507 | A1 | * | 12/2017 | Trent .................... F16D 27/102 |

FOREIGN PATENT DOCUMENTS

| | | |
|---|---|---|
| GB | 2430714 A | 4/2007 |
| JP | 2007093001 A | 4/2007 |

* cited by examiner

*Primary Examiner* — Jacob S. Scott
*Assistant Examiner* — Murad Jahmani
(74) *Attorney, Agent, or Firm* — David Kelley; Brooks Kushman P.C.

(57) ABSTRACT

A rocker plate assembly includes a rocker plate defining a pocket disposed at a periphery of the rocker plate. The rocker plate further includes a pin extending in an axial direction within the pocket. The rocker plate assembly further includes a rocker disposed at least partially within the pocket. The rocker is rotatably mounted to the pin.

17 Claims, 5 Drawing Sheets

PIN-MOUNTED ROCKER

TECHNICAL FIELD

This disclosure relates generally to vehicle clutches, and more particularly, to a pin-mounted rocker for use in a vehicle clutch.

BACKGROUND

A one-way clutch generally includes an inner race coupled to a first rotatable component and an outer race coupled to a second rotatable component. The one-way clutch engages to transfer torque between the inner race and outer race when the relative rotation between the first and second components is in one direction, and disengages to free wheel when the relative rotation is in a second direction. Some one-way clutch arrangements are controllable to operate in multiple modes. As an example, the inner and outer races can be selectively maintained in a disengaged state to free wheel in both directions of relative rotation, and/or selectively maintained in an engaged state to transfer torque in both directions of relative rotation.

SUMMARY

In one approach, a rocker plate assembly includes a rocker plate defining a pocket disposed at a periphery of the rocker plate. In some approaches, the pocket defines an axial depth that is less than an axial thickness of the rocker plate.

The rocker plate further includes a pin extending in an axial direction within the pocket. The rocker plate assembly further includes a rocker disposed at least partially within the pocket. The rocker is rotatably mounted to the pin.

The pocket may further include a shelf portion disposed within the pocket. The shelf portion may have an axial height less than the axial depth of the pocket. For example, the shelf portion may have an axial height corresponding to approximately 75% of the axial depth of the pocket. A combined axial height of the shelf portion and the pin may generally correspond to the axial depth of the pocket.

The shelf portion may include an abutment surface extending in the axial direction, and a shoulder surface extending in generally perpendicular to the abutment surface. In some approaches, the pin extends from the shoulder surface in the axial direction.

In some approaches, the rocker includes a body portion and a mounting portion extending from the body portion. The body portion may include an engagement portion having a first thickness, a neck portion having a second thickness, and a base portion having a third thickness. In some approaches, at least the second thickness is different than the first thickness and the third thickness.

The base portion may define abutment surfaces extending asymmetrically from a central axis of the rocker. A combined axial height of the abutment surfaces and the mounting portion may generally correspond to an axial height of the rocker.

The mounting portion may have an axial height less than an axial height of the rocker. For example, the axial height of the mounting portion may correspond to approximately 20% of the axial height of the rocker.

The mounting portion may include an aperture disposed in the mounting portion. In some approaches, the aperture extends through less than an axial height of the mounting portion. In other approaches, the aperture extends through an entire axial height of the mounting portion. The mounting portion may be, for example, a continuous ring defining the aperture.

In another approach, a one-way clutch includes a rocker plate assembly. The rocker plate assembly includes a rocker plate defining a pocket disposed at an outer periphery of the rocker plate. The rocker plate may further include a pin extending in an axial direction within the pocket.

The rocker plate assembly further includes a rocker having a mounting portion rotatably mounted to the pin. The rocker further has a body portion rotatable between a disengaged configuration wherein the body portion is disposed within the pocket, and an engaged configuration wherein at least a part of the body portion is disposed out of the pocket.

The one-way clutch further includes an outer race arranged concentrically with the rocker plate. The outer race may have a plurality of teeth disposed on an inner surface of the outer race. The plurality of teeth may define a notch therebetween. The notch may be adapted to receive the part of the body portion disposed out of the pocket.

In another approach, a one-way clutch includes a first race having a periphery provided with a tooth. The one-way clutch further includes a second race having pocket, a shelf portion disposed within the pocket and having an axial height less than an axial depth of the pocket, and a pin extending from the shelf portion. The one-way clutch further includes a rocker rotatably mounted to the pin. The rocker may include a mounting portion having an axial height less than an axial height of the rocker.

In one approach, the first race is an inner race, and the second race is an outer race arranged concentrically with the inner race. In another approach, the first race is an outer race, and the second race is an inner race arranged concentrically with the outer race.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In the following discussion of the Figures, a polar coordinate system is utilized. An axial direction extends along an axis of rotation of the clutch. A radial direction extends orthogonal to the axial direction from the axis of rotation toward a periphery of the clutch. A circumferential direction extends orthogonal to the radial direction within the general plane of the clutch.

Figure 1:
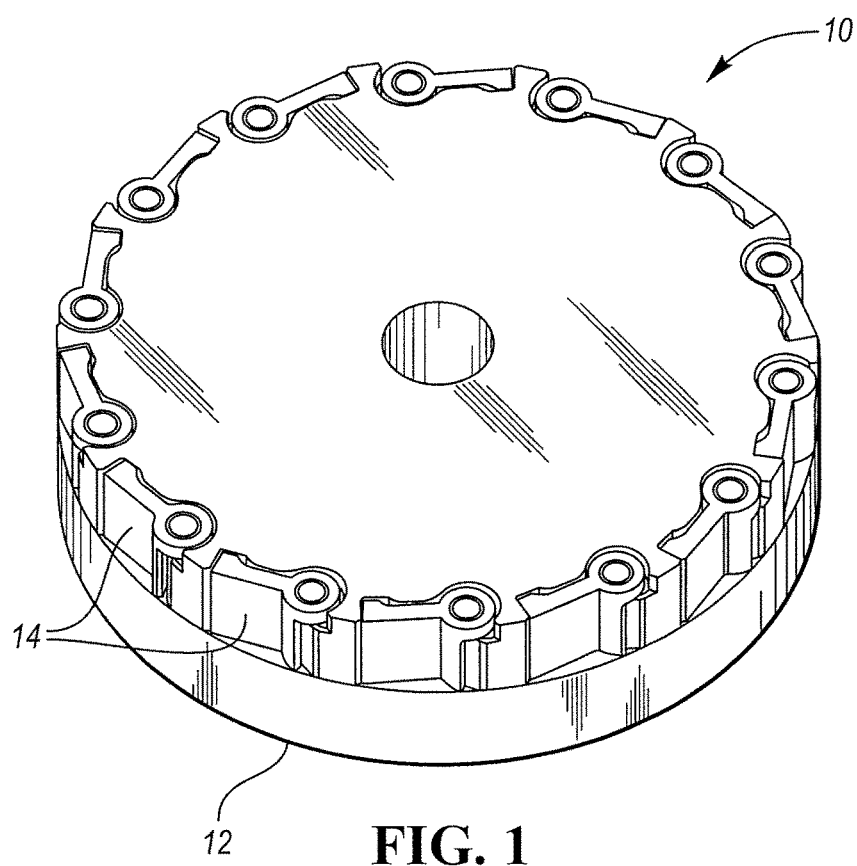
FIG. 1 is a perspective view of a rocker plate assembly.

Referring now to FIG. 1, a rocker plate assembly 10 includes a rocker plate 12 adapted to receive one or more struts or rockers 14. For example, as shown, the rocker plate assembly 10 may include fourteen rockers 14. The rockers 14 may be angularly spaced mutually about a central axis of the rocker plate 12.

The rockers 14 are rotatable relative the rocker plate 12 between a disengaged configuration, in which the rockers 14 may be substantially retained within an outer perimeter of the rocker plate 12, and an engaged configuration, in which a portion the rockers 14 extends beyond the outer perimeter of the rocker plate 12. As described in greater detail elsewhere herein, the rocker plate assembly 10 may be used in a one-way clutch assembly.

Figure 2:
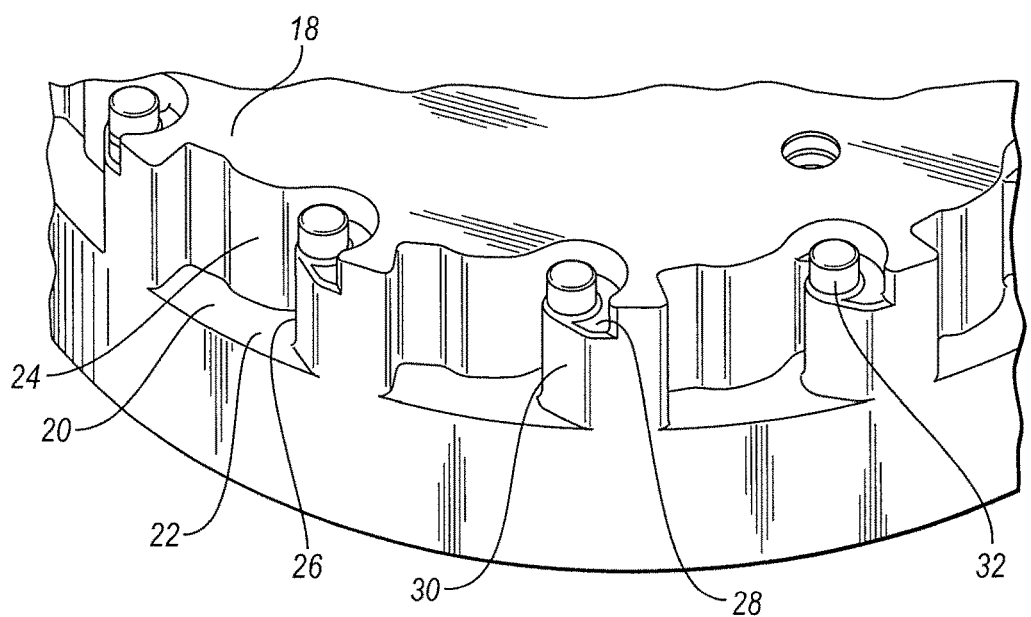
FIG. 2 is a detail view of a rocker plate.

Referring now to FIG. 2, the rocker plate 12 defines an axial face 18 and includes one or more pockets 20 disposed in the axial face 18 for receiving a corresponding rocker 14. A pocket 20 may be defined, for example, by a first wall 22 adapted to inhibit movement of a rocker 14 in a first axial direction, and a second wall 24 adapted to inhibit movement of a rocker 14 in a first radial direction toward the central axis of the rocker plate 12. In one approach, contours of the second wall 24 generally correspond to contours of a rocker 14 such that, when in a disengaged configuration, the rocker 14 engages the second wall 24 along a contour of the rocker 14.

As shown, the pockets 20 may have a depth (e.g., an axial depth taken along the axial direction) that is less than an axial thickness of the rocker plate 12.

The rocker plate 12 may include a shelf portion 26 disposed within a pocket 20. In one approach, the shelf portion 26 has a height in the axial direction less than the depth of the pocket in the axial direction. For example, the shelf portion 26 may have height corresponding to approximately 50-90% of the axial depth of the pocket 20, and more particularly, approximately 65-80% of the axial depth of the pocket 20, and even more particularly, approximately 75% of the axial depth of the pocket 20.

The shelf portion 26 may be formed integrally with the rocker plate 12, or may be a discrete component secured to the rocker plate 12. The shelf portion 26 may define a shoulder surface 28 and a pocket abutment surface 30. The pocket abutment surface 30 may extend, for example, in the axial direction. The shoulder surface 28 may extend, for example, generally perpendicular to the pocket abutment surface 30 (e.g., in the radial direction).

The rocker plate 12 may further include a pin 32. As shown in FIG. 2, the pin 32 may be disposed on the shelf portion 26 within the pocket 20. For example, the pin 32 may extend from the shelf portion 26 in the axial direction. In some approaches, the pin 32 extends from the shelf portion 26 to a plane defined by the axial face 18 of the rocker plate 12. In this way, the combined axial heights of the shelf portion 26 and the pin 32 generally corresponds to (e.g., generally equals) the axial depth of the pocket 20. In other approaches, the pin 32 does not extend to the plane defined by the axial face 18. In this way, the combined axial heights of the shelf portion 26 and the pin 32 is less than the axial depth of the pocket 20.

An outer wall of the pin 32 is preferably spaced from the second wall 24 about an entire periphery of the pin 32. In this way, the pin 32 may receive a portion of a rocker 14 above the shoulder surface 28 between the pin 32 and the second wall 24.

Figure 3:
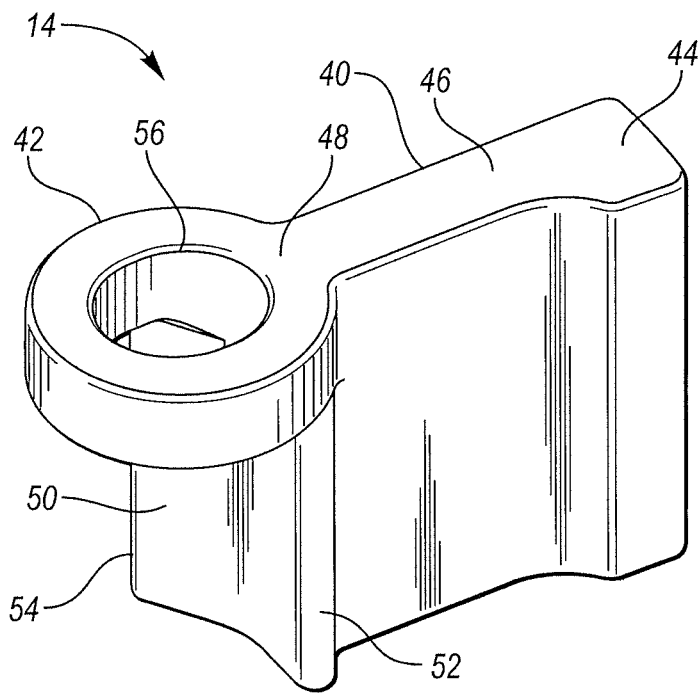
FIG. 3 is a perspective view of a rocker.
Figure 4:
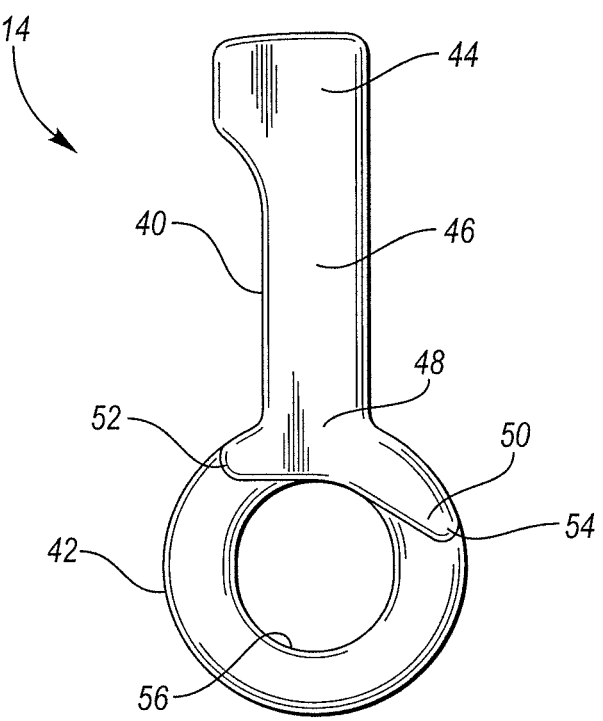
FIG. 4 is a bottom plan view of a rocker.

Referring now to FIGS. 3 and 4, a rocker 14 generally includes a body portion 40 and a mounting portion 42. The body portion 40 and the mounting portion 42 may be dimensioned such that, when the rocker 14 is disposed in the disengaged configuration, substantially the entire rocker 14 is maintained within the outer perimeter of the rocker plate 12. In some approaches, a portion of the rocker 14 may extend beyond the outer perimeter of the rocker plate 12 even when the rocker 14 is disposed in the disengaged configuration.

The body portion 40 may include an engagement portion 44. As discussed in greater detail elsewhere herein, when the rocker 14 pivots to an engaged configuration, the engagement portion 44 may engage a surface of another components (e.g., teeth of an outer race member or gear).

The body portion 40 may also include a neck portion 46 adjacent the engagement portion 44. In one approach, the engagement portion 44 has a first thickness (e.g., in a generally radial direction), and the neck portion 46 has a second thickness different than the first thickness. For example, as shown in FIGS. 3 and 4, the neck portion 46 may have a thickness less than that of the engagement portion 44.

The body portion 40 may also include a base portion 48 adjacent the neck portion 46. In one approach, the base portion 48 has a thickness (e.g., in a generally radial direction) different than that of the neck portion 46. For example, the base portion 40 may have a thickness greater than that of the neck portion 46.

In one approach, the base portion 48 includes a base extension 50 extending from the base portion 48. The base extension 50 may extend a greater length than an opposing portion of the base portion 48. In this way, as shown in the bottom plan view of FIG. 4, the base portion 48 may be an asymmetric base portion.

The base portion 48 and the base extension 50 may define one or more rocker abutment surfaces 52, 54, respectively. The rocker abutment surfaces 52, 54 may be, for example, at end regions of the base portion 48 and the base extension 50, respectively. The rocker abutment surfaces 52, 54 may be dimensioned to engage the pocket abutment surface 30 to restrict rotational movement of the rocker 14 about the pin 32 in first and second rotational directions, respectively.

In some approaches (for example, as shown in FIG. 4), due to the mounting portion 42, the rocker abutment surfaces 52, 54 have axial heights less than the axial height of the base portion 48 of the rocker 14. In this way, the combined axial heights of the rocker abutment surfaces 52, 54 and the mounting portion 42 generally corresponds to (e.g., generally equals) the axial height of the rocker 14.

In some approaches (for example, as shown in FIG. 4), due to the base extension 50, rocker abutment surface 54 may be spaced a greater distance from the neck portion 46 of the rocker 14. In this way, the rocker abutment surfaces 52, 54 are asymmetric rocker abutment surfaces relative to, for example, a central axis of the rocker 14.

The mounting portion 42 may extend from the body portion 40; for example, from the base portion 48 of the body portion 40. In one approach, shown in FIG. 3, the mounting portion 42 has a height less than the height of the rocker 14. For example, the mounting portion 42 has an axial height less than the axial height of the body portion 40. The mounting portion 42 may have height corresponding to approximately 10-50% of the axial height of the body portion 40, and more particularly, approximately 15-30% of the axial height of the body portion 40, and even more particularly, approximately 20% of the axial height of the body portion 40.

In other approaches, the mounting portion 42 has a height equal to or greater than the height of the body portion 40.

The mounting portion 42 may define an aperture 56 disposed in the mounting portion 42. The mounting portion 42 may form, for example, a continuous annular ring disposed about the aperture 56. In another approach, the mounting portion 42 may form a discontinuous mounting portion defining a portion of the aperture 56.

In one approach, the aperture 56 is a hole disposed through an entire height of the mounting portion 42. In another approach, the aperture 56 is a slot disposed through less than an entire height of the mounting portion 42.

The aperture 56 may be dimensioned to receive the pin 32 of the shelf portion 26. For example, the aperture 56 may have an internal diameter large enough to accommodate an external diameter of the pin 32.

During rotation of the rocker plate 12, centrifugal forces directed radially outwardly from the central axis of rotation act on the rockers 14. In one approach, the center of gravity location of each rocker 14 is located relative to the respective pivot center such that the rockers 14 engage under centrifugal load. In another approach, the center of gravity location of each rocker 14 is located relative to the respective pivot center such that the rockers 14 disengage under centrifugal load. Additionally, the centers of gravity of the rockers 14 can be optimized relative to the pivot center to control when and how fast the rockers 14 engage under centrifugal load.

Furthermore, due at least in part to the mounting portion 42 of the rocker 14, the center of mass of each rocker 14 may be offset from a central axial plane of the rocker 14 in the direction of the axial face 18 of the rocker plate 12. In this way, movement of the rocker 14 toward the engaged configuration may occur at lower rocker plate rotational speeds as compared to previous approaches.

As described, centrifugal forces caused by the rotation of the rocker plate 12 may cause the rockers 14 to pivot out of the pockets 20 to the engaged configuration. In still other approaches, the rocker plate 12 may include one or more biasing members for urging the rockers 14 to pivot toward the engaged configuration. The biasing members may be disposed in recesses adjacent respective pockets 20. In one approach, the biasing member is a spring, such as a helical coiled compression spring or an accordion compression spring. In another approach, the biasing member is a pin or other driven member. The driven member may be, for example, an electro-magnetically actuated driven member.

In the engaged configuration, the abutment surface 54 of the base extension 50 engages the pocket abutment surface 30, thereby limiting the "swing-out" range of the rocker 14. In this configuration, reaction forces are transmitted through the body portion 40 of the rocker 14 and are absorbed in shelf portion 26 of the rocker plate 12. In this way, the mounting portion 42 of the rocker 14 and the pin 32 of the rocker plate 12 experience relatively little loading, or even no loading. That is, the body portion 40 of the rocker 14 and the shelf portion 26 of the rocker plate 12 may function as high load-bearing portions, whereas the mounting portion 42 of the rocker 14 and the pin 32 of the rocker plate 12 function to retain the rocker 14 within the pockets 20 of the rocker plate 12. This arrangement may substantially reduce the likelihood of failure of the rocker plate 12 and/or the rocker 14 as compared to previous approaches.

Figure 5:
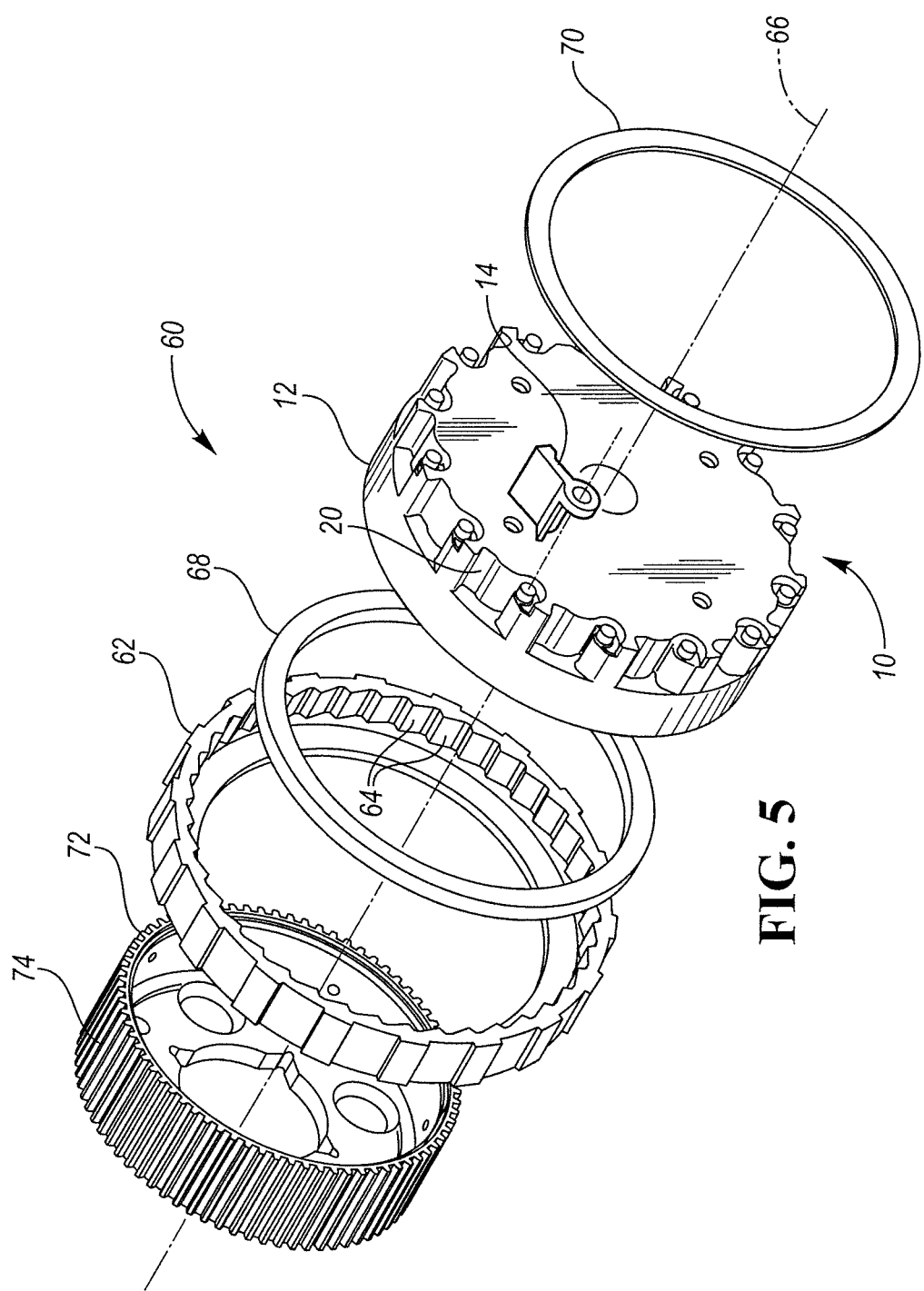
FIG. 5 is an exploded perspective view of a first clutch assembly.

Referring now to FIG. 5, the rocker plate assembly 10 may be used in a first exemplary clutch assembly 60. The clutch assembly 60 may be, for example, a one-way clutch assembly. The clutch assembly 60 includes a rocker plate 12, one or more rockers 14 rotatably mounted within pockets 20 of the rocker plate 12, an outer race or cam plate 62. The inner periphery of the outer race 62 may be formed with a plurality of cams or notches 64 angularly spaced mutually about a central axis of rotation 66. For example, the outer race 62 may include thirty-six notches 64.

The clutch assembly 60 may further include a bushing 68. The bushing 68 may fit within the outer race 62 and may be adapted to pilot the rocker plate 12 and the outer race 62. The bushing may be formed of any suitable material; for example, steel backed bronze or a powdered metal.

The clutch assembly 60 may further include a retainer ring 70 adapted to contact an axial surface of the rocker plate 12. The retainer ring 70 is dimensioned so as to close the axial end of each pocket 20 of the rocker plate 12.

The clutch assembly 60 may be assembled with the outer race 62 driveably connected to a component of a vehicle drive system. For example, the outer race 62 may be driveably connected to a drum 72. The outer race 62 may be driveably connected to the drum 72 by splines 74 located on the outer periphery of the drum 72.

During operation, when the rocker plate assembly 10 rotates counterclockwise faster than the outer race 62, each rocker 14 pivots clockwise in its pocket 20 away from engagement with the notches 64 due to contact of the rockers 14 with the inner radial surface of the outer race 62. This allows the rocker plate 12 to rotate freely counterclockwise about axis 66 relative to the outer race 62.

When the rocker plate 12 rotates clockwise relative to the outer race 62, centrifugal forces cause the rockers 14 to pivot out of the pockets 20 toward the outer race 62 and into engagement with the notches 64 of the outer race 62. When the rockers 14 are in the engaged configuration, the rocker plate 12 and outer race 62 are engaged or driveably connected. In this way, clockwise rotation of the rocker plate 12 effects a corresponding rotation of the outer race 62, as well as the drum 72, which is rotatably fixed relative to the outer race 62.

Figure 6:
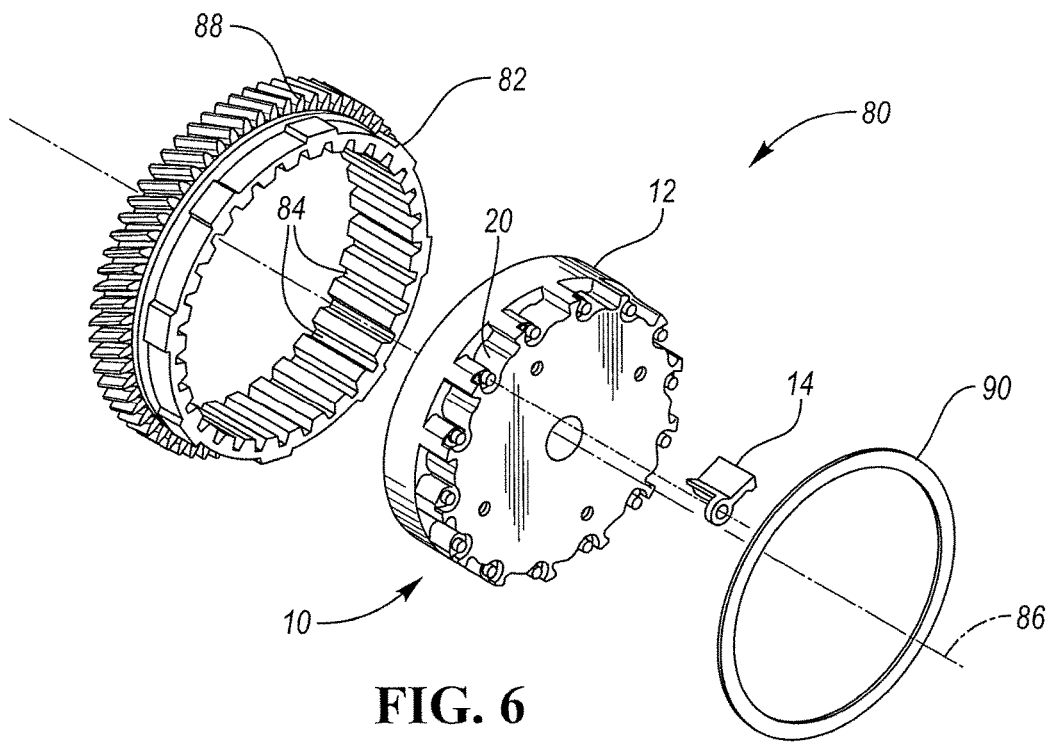
FIG. 6 is an exploded perspective view of a second clutch assembly.

Referring now to FIG. 6, the rocker plate assembly 10 may be used in a second exemplary clutch assembly 80. The clutch assembly 80 may be, for example, a one-way clutch assembly. The clutch assembly 80 includes a rocker plate 12, one or more rockers 14 rotatably mounted within pockets 20 of the rocker plate 12, an outer race or cam plate 82. The rocker plate 12 and rockers 14 may be held in position axially by a snap ring (not shown).

The inner periphery of the outer race 82 may be formed with a plurality of cams or notches 84 angularly spaced mutually about a central axis of rotation 86. For example, the outer race 82 may include thirty-one notches 84. In the approach shown in FIG. 6, the outer race 82 is formed integrally with a gear 88. In other approaches, however, the outer race 82 and gear 88 may be formed separately and joined by a spline or other means.

The clutch assembly 80 may further include a retainer ring 90 adapted to contact an axial surface of the rocker plate 12. The retainer ring 90 is dimensioned so as to close the axial end of each pocket 20 of the rocker plate 12.

As previously discussed, when the clutch 80 is disengaged, the rockers 14 are contained within pockets 20 formed into the rocker plate 12. When clutch 80 is engaged, the rockers 14 pivot and engage the notches 84 of the outer race 82.

Figure 7:
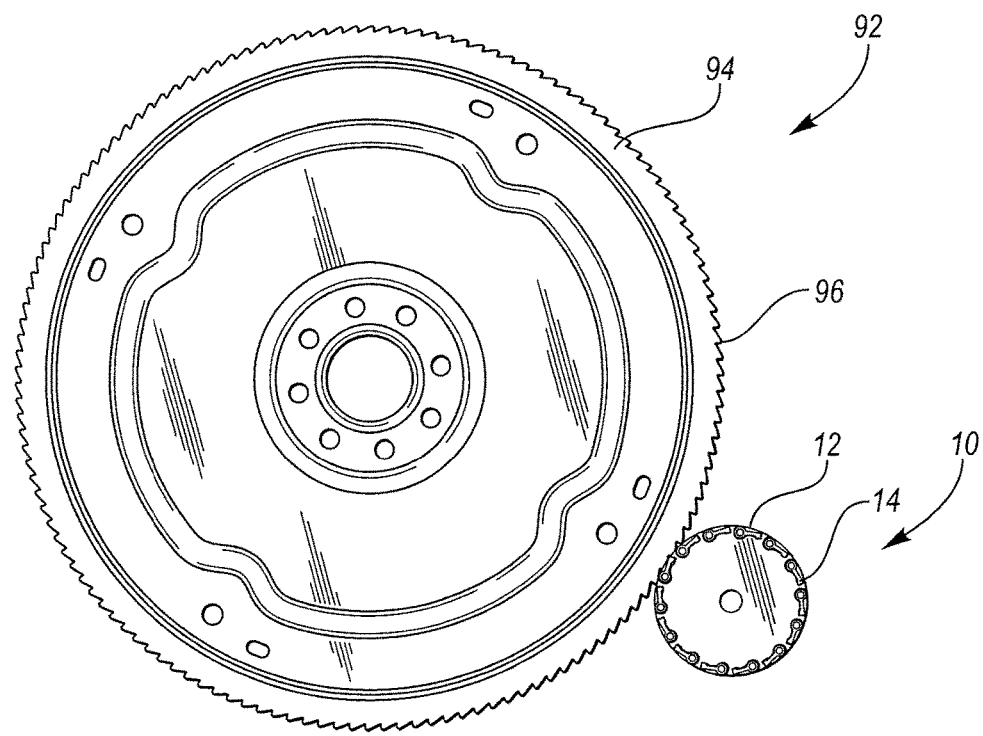
FIG. 7 is a front elevation view of a third clutch assembly.

Referring now to FIG. 7, the rocker plate assembly 10 may be used in a third exemplary clutch assembly 92. The clutch assembly 92 may be, for example, a one-way clutch assembly. The clutch assembly 92 includes a rocker plate 12, one or more rockers 14 rotatably mounted within pockets of the rocker plate 12. The rocker plate 12 and rockers 14 may be held in position axially by a snap ring (not shown).

In this approach, the rockers 14 may arranged to engage an adjacent gear 94. More specifically, the rockers 14 may be arranged to engage one or more cams or notches 96 angularly spaced about adjacent gear 94. As shown in FIG. 7, the adjacent gear 94 may have a central axis of rotation that is offset from the central axis of rotation of the rocker plate assembly 10.

Figure 8:
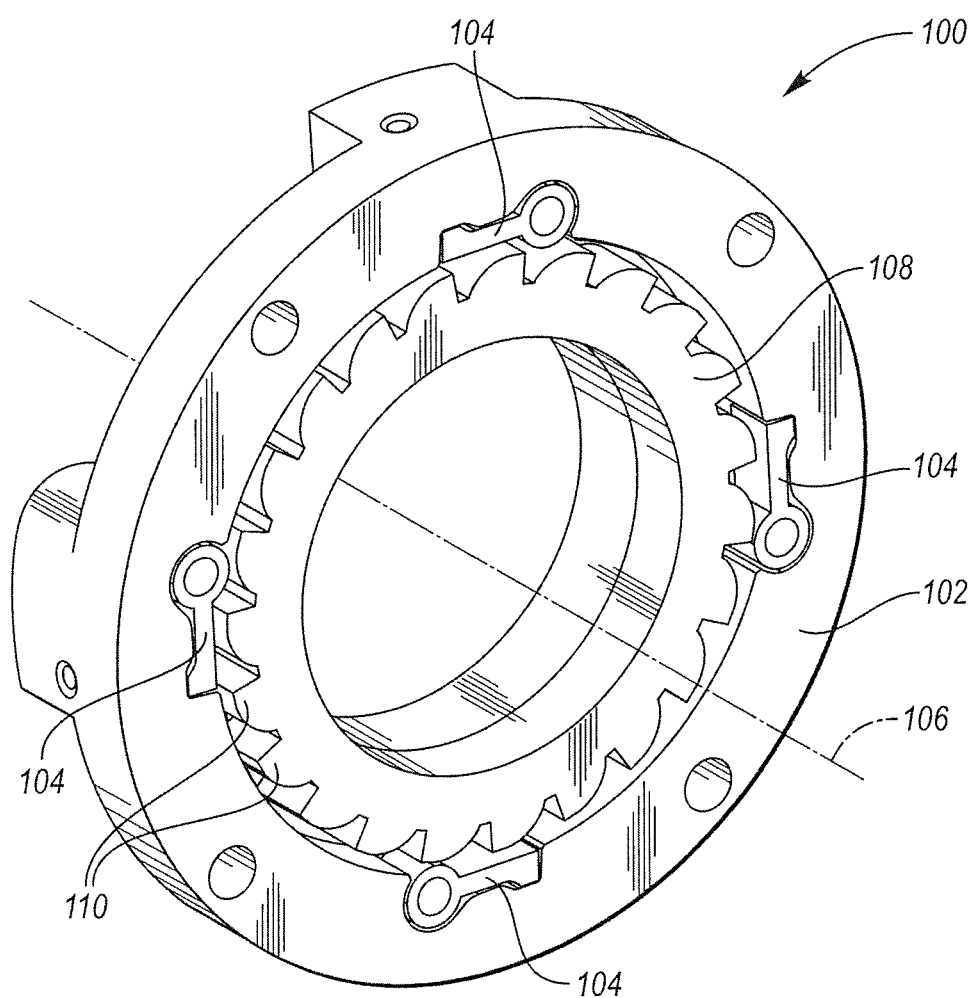
FIG. 8 is a perspective view of an alternative rocker plate assembly.

Referring now to FIG. 8, another exemplary rocker plate assembly 100 may include a rocker plate 102 adapted to receive one or more rockers 104. For example, as shown, the rocker plate assembly 100 may include four rockers 104. The rockers 104 may be angularly spaced mutually about a central axis 106 of the rocker plate 102. The rockers 104 may be substantially the same rockers 14 as previously described. Similarly, the pockets may have substantially the same features as pockets 20 previously described (e.g., shelf portion 26, pin 32, etc.).

In the approach of FIG. 8, the rocker plate 102 may be an outer race. The rocker plate assembly 100 may further include an inner race or cam plate 108. The outer periphery of the inner race 108 may be formed with a plurality of cams or notches 110 angularly spaced mutually about the central axis of rotation 106. For example, the inner race 108 may include twenty-three notches 110.

During rotation of the rocker plate 102, centrifugal forces directed radially outwardly from the central axis of rotation act on the rockers 104. In one approach, the center of gravity location of each rocker 104 is located relative to the respective pivot center such that the rockers 104 engage under centrifugal load. In another approach, the center of gravity location of each rocker 104 is located relative to the respective pivot center such that the rockers 104 disengage under centrifugal load. Additionally, the centers of gravity of the rockers 104 can be optimized relative to the pivot center to control when and how fast the rockers 104 engage under centrifugal load.

Furthermore, the center of mass of each rocker 104 may be offset from a central axial plane of the rocker 104 in the direction of the axial face of the rocker plate 102. In this way, movement of the rocker 104 toward the engaged configuration may occur at lower rocker plate rotational speeds as compared to previous approaches.

As described, centrifugal forces caused by the rotation of the rocker plate 102 may cause the rockers 104 to pivot out of the pockets to the engaged configuration. In still other approaches, the rocker plate 102 may include one or more biasing members for urging the rockers 104 to pivot toward the engaged configuration. The biasing members may be disposed in recesses adjacent respective pockets. In one approach, the biasing member is a spring, such as a helical coiled compression spring or an accordion compression spring. In another approach, the biasing member is a pin or other driven member. The driven member may be, for example, an electro-magnetically actuated driven member.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A rocker plate assembly comprising:
   a rocker plate defining a pocket disposed at a periphery of the rocker plate, wherein the rocker plate further includes a pin extending in an axial direction within the pocket; and
   a rocker disposed at least partially within the pocket, wherein the rocker is rotatably mounted to the pin wherein the pocket defines an axial depth, the axial depth being less than an axial thickness of the rocker plate, and wherein the pocket further includes a shelf portion disposed within the pocket, the shelf portion having an axial height less than the axial depth of the pocket.

2. The rocker plate assembly of claim 1, wherein the shelf portion has an axial height corresponding to approximately 75% of the axial depth of the pocket.

3. The rocker plate assembly of claim 1, wherein a combined axial height of the shelf portion and the pin generally corresponds to the axial depth of the pocket.

4. The rocker plate assembly of claim 1, wherein the shelf portion includes an abutment surface extending in the axial direction, and a shoulder surface extending generally perpendicular to the abutment surface.

5. The rocker plate assembly of claim 4, wherein the pin extends from the shoulder surface in the axial direction.

6. The rocker plate assembly of claim 1, wherein the rocker includes a body portion and a mounting portion extending from the body portion.

7. The rocker plate assembly of claim 6, wherein the body portion includes an engagement portion having a first thickness, a neck portion having a second thickness, and a base portion having a third thickness, wherein at least the second thickness is different than the first thickness and the third thickness.

8. The rocker plate assembly of claim 7, wherein the base portion defines abutment surfaces extending asymmetrically from a central axis of the rocker.

9. The rocker plate assembly of claim 8, wherein a combined axial height of the abutment surfaces and the mounting portion generally corresponds to an axial height of the rocker.

10. The rocker plate assembly of claim 6, wherein the mounting portion has an axial height less than an axial height of the rocker.

11. The rocker plate assembly of claim 10, wherein the axial height of the mounting portion corresponds to approximately 20% of the axial height of the rocker.

12. The rocker plate assembly of claim 6, wherein the mounting portion includes an aperture disposed in the mounting portion.

13. The rocker plate assembly of claim 12, wherein the aperture extends through less than an axial height of the mounting portion.

14. The rocker plate assembly of claim 12, wherein the mounting portion is a continuous ring defining the aperture, and wherein the aperture extends through an entire axial height of the mounting portion.

15. A one-way clutch comprising:
a rocker plate assembly comprising:
a rocker plate defining a pocket disposed at an outer periphery of the rocker plate, wherein the rocker plate further includes a pin extending in an axial direction within the pocket;
a rocker having a mounting portion rotatably mounted to the pin, and having a body portion rotatable between a disengaged configuration in which the body portion is disposed within the pocket, and an engaged configuration in which at least a part of the body portion is disposed out of the pocket, wherein the mounting portion extends from the body portion and includes an aperture disposed in the mounting portion, wherein the aperture extends through less than an axial height of the mounting portion; and
an outer race arranged concentrically with the rocker plate, wherein the outer race has a plurality of teeth disposed on an inner surface of the outer race, wherein the plurality of teeth define a notch therebetween, and wherein the notch is adapted to receive the part of the body portion disposed out of the pocket.

16. A one-way clutch comprising:
a first race having a periphery provided with a tooth;
a second race having pocket, a shelf portion disposed within the pocket and having an axial height less than an axial depth of the pocket, and a pin extending from the shelf portion; and
a rocker rotatably mounted to the pin, the rocker including a mounting portion having an axial height less than an axial height of the rocker.

17. The one-way clutch of claim 16, wherein the first race is an outer race, and the second race is an inner race arranged concentrically with the outer race.

* * * * *